(12) United States Patent
Chen et al.

(10) Patent No.: US 8,194,743 B2
(45) Date of Patent: Jun. 5, 2012

(54) DISPLACEMENT ESTIMATION DEVICE AND METHOD FOR THE SAME

(75) Inventors: Hsin-Chia Chen, HsinChu (TW); Yi-Fang Lee, HsinChu (TW); Tzu-Yi Chao, HsinChu (TW)

(73) Assignee: Pixart Imaging Incorporation, Hsin-Chu (TW)

( * ) Notice: Subject to any disclaimer, the term of this patent is extended or adjusted under 35 U.S.C. 154(b) by 1743 days.

(21) Appl. No.: 11/477,109

(22) Filed: Jun. 28, 2006

(65) Prior Publication Data

US 2007/0154069 A1    Jul. 5, 2007

(30) Foreign Application Priority Data

Dec. 30, 2005  (TW) ................................ 94147531 A

(51) Int. Cl.
   *H04N 7/12*  (2006.01)
   *H04N 11/02*  (2006.01)
   *H04N 11/04*  (2006.01)
(52) U.S. Cl. .................... 375/240.16; 348/399
(58) Field of Classification Search .................. 348/699; 375/240.16

See application file for complete search history.

(56) References Cited

U.S. PATENT DOCUMENTS

| | | | | |
|---|---|---|---|---|
| 6,005,980 A * | 12/1999 | Eifrig et al. | ................. | 382/236 |
| 6,901,110 B1 * | 5/2005 | Tsougarakis et al. | .... | 375/240.12 |
| 7,042,439 B2 * | 5/2006 | Luo | ................................. | 345/157 |
| 7,227,893 B1 * | 6/2007 | Srinivasa et al. | ......... | 375/240.08 |
| 7,362,379 B2 * | 4/2008 | Michel et al. | .................. | 348/452 |

OTHER PUBLICATIONS

Dalai, Navneet; Triggs, Bill; Histograms of Oriented Gradients for Human Detection; Jun. 25, 2005; IEEE Computer Society; Conference on Computer Vision and Pattern Recognition; vol. 1; pp. 886-893.*

Normalize; Merriam Webster Online Dictionary; available at www.merriam-webster.com/dictionary/normalize.*

* cited by examiner

*Primary Examiner* — Mehrdad Dastouri
*Assistant Examiner* — Jeremaiah Hallenbeck-Huber
(74) *Attorney, Agent, or Firm* — Tung & Associates

(57) ABSTRACT

A displacement estimation device includes a vector calculator and a displacement calculator, for use in estimating a displacement vector from a pattern in a first original image to a pattern in a second original image. The vector calculator calculates a parameter for each pixel in the first original image and the second original image. The parameter of a pixel integrates the information of the intensities of all the pixels in a region of interest (ROI) surrounding the pixel, and the relative distances from all the pixels in the ROI to the pixel. The displacement calculator calculates the displacement vector from a pattern in the first original image to a pattern in the second original image based on the parameters calculated by the vector calculator for the first original image and the second original image.

7 Claims, 13 Drawing Sheets

First Image  Second Image

ROI

| 0 | 15 | 37 | 41 | 56 |
|---|----|----|----|----|
| 9 | 12 | 91 | 30 | 43 |
| 9 | 19 | 24 | 48 | 57 |
| 4 | 5  | 18 | 87 | 71 |
| 10| 20 | 35 | 9  | 11 |

FIG. 4 (Prior Art)

| 15 | 22 | 4  | 15 |
|----|----|----|----|
| 3  | 79 | 61 | 13 |
| 10 | 5  | 24 | 9  |
| 1  | 13 | 69 | -16|
| 10 | 15 | 26 | 2  |

FIG. 5 (Prior Art)

| 12 | 14 | 24 | 3  |
|----|----|----|----|
| 8  | 3  | 82 | -70|
| -21| 9  | 4  | 22 |
| 0  | 0  | 12 | 68 |
| 9  | 9  | 12 | 25 |

FIG. 6 (Prior Art)

| 0 | 0 | 0 | 0 | 0 | 0 | 0 |
|---|---|---|---|---|---|---|
| 0 | 13 | 53 | 25 | 41 | 48 | 0 |
| 0 | 22 | 12 | 91 | 19 | 35 | 0 |
| 0 | 9 | 19 | 24 | 26 | 60 | 0 |
| 0 | 4 | 5 | 18 | 43 | 65 | 0 |
| 0 | 10 | 20 | 35 | 50 | 16 | 0 |
| 0 | 0 | 0 | 0 | 0 | 0 | 0 |

FIG. 9

| | | | | |
|---|---|---|---|---|
| (70/214, 23/214) | (93/307, -34/307) | (-17/360, -3/360) | (-10/373, -31/373) | (30/363, 48/363) |
| (40/172, 42/172) | (96/268, 39/268) | (2/310, 5/310) | (3/369, 4/369) | (57/372, -9/372) |
| (1/106, 43/106) | (98/204, 98/204) | (52/257, 56/257) | (27/381, 19/381) | (72/408, -84/408) |
| (21/90, -3/90) | (54/144, -13/144) | (75/240, -36/240) | (64/337, 9/337) | (22/401, 64/401) |
| (21/93, -27/93) | (64/157, -38/157) | (98/276, -39/276) | (9/328, 25/328) | (-46/337, 91/337) |

FIG. 10

| 0 | 1 | 0 | 0 | 0 |
|---|---|---|---|---|
| 0 | 0 | 0 | 0 | 1 |
| 0 | 0 | 0 | 0 | 1 |
| 1 | 1 | 1 | 0 | 0 |
| 1 | 1 | 1 | 0 | 1 |

First Gravity
Indices Image

Gravity of the
Gravity Indices = (-1, 5)

Second Gravity
Indices Image

Gravity of the
Gravity Indices = (4, 5)

DISPLACEMENT ESTIMATION DEVICE AND METHOD FOR THE SAME

BACKGROUND OF THE INVENTION

1. Field of the Invention

The present invention relates to a displacement estimation device and a method for the same; in particular, the present invention relates to a device and a method for estimating the displacement between two patterns in two successive images.

2. Description of the Related Art

Referring to FIG. 1, a conventional optical mouse typically comprises an image capture device 221 and a displacement calculator 222.

The image capture device 221 continuously captures images and transmits the images to the displacement calculator 222. The displacement calculator 222 compares patterns in two successive images and calculates a displacement vector corresponding to the displacement between two corresponding patterns. The displacement vector, as a result of the calculation, is sent to a computer (not shown) by the displacement calculator 222, for moving a cursor on a computer screen.

Referring to FIG. 2, as an example, the image capture device 221 captures a first image IMAGE1 at a first timing, and later captures a second image IMAGE2 at a second timing, wherein both the first and the second images have a size of 7×7 pixels.

According to prior art, the method for calculating a displacement vector from the first image to the second image includes the following steps: first, selecting a region of interest (ROI) in the first image; next, determining which location has the ROI moved to in the second image; and last, calculating a displacement vector based on the location information.

Referring to FIG. 3, a conventional method is shown in which the displacement vector is calculated by correlation estimation. The method moves the ROI around the second image and estimates the correlations between the ROI and image regions in different locations on the second image. The location of an image region most correlated to the ROI is the most matching location, i.e., the pattern in this location is most similar to the pattern in the ROI. Then, the location of the ROI in the first image and the most correlated location in the second image may be used to obtain the displacement vector.

In the abovementioned conventional method, the correlation is basically estimated by superimposing two images and calculating the intensity difference between two superimposed pixels. However, if the pattern in any of the two images is distorted, such as rotated, shrunk, or enlarged, or if the pattern is shaded from light, it may easily induce errors in the displacement estimation, for that the method only considers the intensities of the pixels, without taking into consideration the relative relationships among the pixels.

U.S. Pat. No. 6,859,199 B2 discloses another method for use by the displacement calculator 222. The method first calculates the difference between the intensities of two adjacent pixels. The difference is accepted as a feature and included in a feature set only if the absolute value of the difference is larger than a threshold. A feature set is obtained after completing calculation for all the differences between adjacent pixels. The displacement vector from the feature set of the first image to the feature set of the second image is determined to be the displacement vector from the pattern of the first image to the pattern of the second image.

As a more specific example, referring to FIG. 4, each pixel in the first image has an intensity value as shown in the figure. According to the '199 patent, a difference table is obtained by subtracting the intensity value of each pixel from the intensity value of its right-side adjacent pixel, as shown in FIG. 5. Assuming a threshold is set at 20, then a feature set is formed by all the differences larger than 20, as shown by the circled numbers in FIG. 5.

By the same manner, the second image is processed to obtain a difference table as shown in FIG. 6; likewise, the circled numbers in FIG. 6 form the feature set of the second image.

Next, a displacement vector is calculated by comparing the feature set of the first image and the feature set of the second image. By comparing the feature sets in FIGS. 5 and 6, it can be seen that the feature set of the second image has moved one pixel rightward from the location of the feature set of the first image, and thus the displacement vector is (1, 0). This is the displacement vector from the pattern of the first image to the pattern of the second image.

The abovementioned method has a drawback in that, because the intensity difference between pixels in an image may be influenced by noises, the choice of the threshold is very critical to the generation of the feature set. However, it is difficult to choose an optimum threshold, and any inferior choice will negatively impact the estimation of the displacement vector.

SUMMARY OF THE INVENTION

In view of the foregoing, it is an object of the present invention to provide a displacement estimation device which is less sensitive to pattern distortion or light shading.

Another object of the present invention is to provide a displacement estimation method which is less interfered by noises.

A displacement estimation device according to the present invention includes a vector calculator and a displacement calculator, for use in estimating a displacement vector from a pattern in a first original image to a pattern in a second original image, wherein each original image includes a plurality of pixels.

The vector calculator calculates a parameter for each pixel in the first original image and the second original image. The parameter of a pixel integrates the information of the intensities of all the pixels in an ROI surrounding the pixel, and the relative distances from all the pixels in the ROI to the pixel. The displacement calculator is electrically connected with the vector calculator, and calculates the displacement vector from a pattern in the first original image to a pattern in the second original image by means of the parameters calculated by the vector calculator for the first original image and the second original image.

A displacement estimation method according to the present invention, for use in estimating a displacement vector from a pattern in a first original image to a pattern in a second original image, wherein each original image includes a plurality of pixels, comprises the steps of: (A) calculating a parameter for each pixel in the first original image and the second original image, the parameter representing an integrated information of the intensities of all the pixels in an ROI surrounding the pixel, and the relative distances from all the pixels in the ROI to the pixel, and (B) calculating the displacement vector from a pattern in the first original image to a pattern in the second original image by means of the parameters of the first original image and the second original image.

For better understanding the objects, characteristics, and effects of the present invention, the present invention will be described below in detail by illustrative embodiments with reference to the attached drawings.

BRIEF DESCRIPTION OF THE DRAWINGS

FIG. 4 shows an example of a 5×5 image with the intensity of each pixel.

FIG. 5 shows a difference table obtained from subtracting the intensity of a pixel from the intensity of its rightward adjacent pixel.

FIG. 6 shows a difference table obtained for another image.

FIG. 9 is another method to provide an environment for the peripheral pixels, wherein extended 0's are provided at an outer periphery of the original 5×5 image.

FIG. 10 shows the gravity vectors of the pixels in a 5×5 image.

FIG. 11 shows the grouping result of the gravity vectors in FIG. 10.

FIG. 12 is a gravity indices image corresponding to the grouping result shown in FIG. 11.

DESCRIPTION OF THE PREFERRED EMBODIMENT

Figure 7:
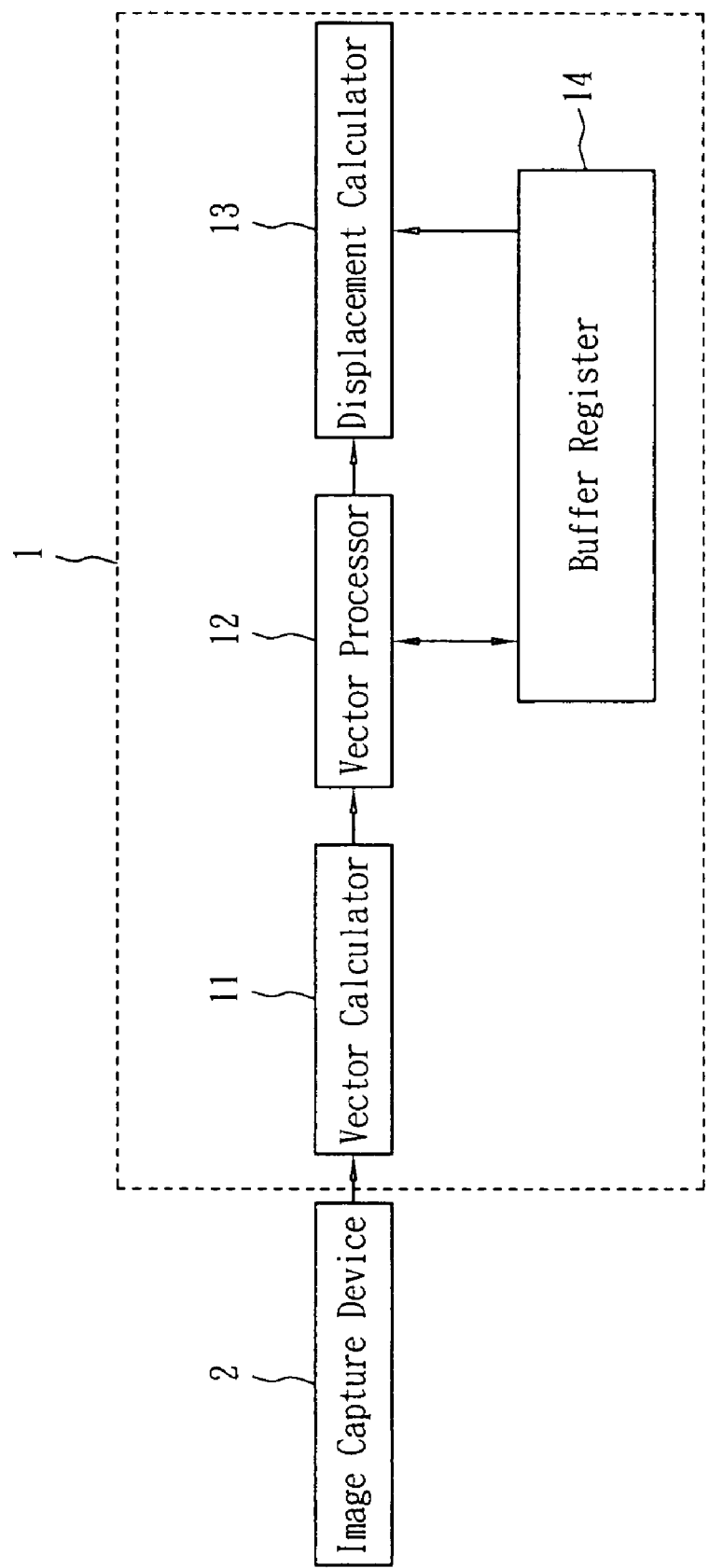
FIG. 7 is a block diagram schematically showing the circuitry of an optical mouse having a displacement estimation device according to a preferred embodiment of the present invention.

FIG. 7 shows a displacement estimation device 1 according to a preferred embodiment of the present invention, for use in estimating a displacement vector from a pattern in a first original image to a pattern in a second original image, wherein each original image includes a plurality of pixels. The displacement estimation device 1 includes a vector calculator 11, a vector processor 12, a displacement calculator 13, and a buffer register 14.

An image capture device 2 is electrically connected with the vector calculator 11. The image capture device 2 successively captures a first image and a second image, and sends the images to the vector calculator 11. Each of the images includes a plurality of pixels.

The vector calculator 11 is electrically connected with the vector processor 12, and it calculates a gravity vector for every pixel in the images. A region of interest (ROI) having a size of N×M pixels is predetermined prior to calculating the gravity vectors by the vector calculator 11. Based on the size of the ROI, the vector calculator 11 will extend the image captured by the image capture device 2 outward, vertically by g(N) pixels and horizontally by g(M) pixels, to obtain a mirror image, wherein $g(x)$=integer of $(x/2)$ and the intensities of the pixels in the extended area are the mirror projection of the intensities of the pixels within the original image. It should be noted that the mirror projection is only one possible approach, and there are other alternatives such as assigning 0's or other values to the intensities of the extended pixels.

Figure 8:
FIG. 8 explains how to obtain a mirror image from an original image.

Referring to FIG. 8 for a more specific example, an original image having a size of 8×8 pixels is captured by the image capture device 2, and the intensities of the pixels of the image are as shown. Assuming that the size of the ROI is 7×7 pixels, then the vector calculator 11 will create virtual pixels with intensities as shown in the dark area, by mirror projection with L1 as an axis. Similarly, the vector calculator 11 will create other virtual pixels by mirror projection with each of the lines L2-L4 as an axis, to obtain the mirror image shown in the figure. The image area encompassed by the lines L1-L4 is the original image.

After the vector calculator 11 obtains the mirror image, it will calculate the gravity vector for each pixel of the original image and sends it to the vector processor 12 for further processing. The calculation of the gravity vector is done according to the following Equation (2-1):

$$\text{Gravity}(x_i, y_i) = [\text{Gravity\_x}_i, \text{Gravity\_y}_i] = \begin{bmatrix} \dfrac{\sum_{j=1}^{P} k(x_j - x_i) u(Dist - |x_j - x_i|) I_j}{\sum_{j=1}^{P} u(Dist - |x_j - x_i|) I_j}, \\ \dfrac{\sum_{j=1}^{P} k(y_j - y_i) u(Dist - |y_j - y_i|) I_j}{\sum_{j=1}^{P} u(Dist - |y_j - y_i|) I_j} \end{bmatrix} \quad \text{Eq. (2-1)}$$

wherein Gravity($x_i$, $y_i$) is the gravity vector of the pixel at the coordinate ($x_i$, $y_i$), P is the total number of pixels included in the ROI, and $I_j$, $x_j$, and $y_j$ are, respectively, the intensity and the x and y coordinates of the jth pixel. In the above equation, according to an embodiment of the present invention, the functions k(x) and k(y) are respectively obtained from the following equations (2-2) and (2-3):

$k(x)=x$      Eq. (2-2)

$k(y)=y$      Eq. (2-3)

But other choices of k(x) and k(y) are also possible, such as $k(x)=x^3$, and $k(y)=y^3$. And, Dist is a constant which is not less than 0, and it can be adjusted according to the size of the ROI, so that for any pixel with the coordinate ($x_j,y_j$), Dist−|$x_j$−$x_i$|≧0 and Dist−|$y_j$−$y_i$|≧0. And when Dist−|$x_j$−$x_i$|≧0, the function u(Dist−|$x_j$−$x_i$|≧1)=1; otherwise, the value of the function is 0. Likewise, if Dist−|$y_j$−$y_i$|≧0, the function u(Dist−|$y_j$−$y_i$|≧0)=1; otherwise, the value of the function is 0.

Because the gravity vector Gravity($x_i,y_i$) at the coordinate ($x_i,y_i$) includes the intensity information of all the pixels in the ROI having a center point ($x_i,y_j$), the present invention integrates the intensities of all the pixels surrounding a pixel into one parameter, i.e., the gravity vector.

Referring to FIG. 9, an example is shown to explain the calculation of the gravity vector Gravity($x_i$,$y_i$) based on the equation (2-1). As shown in the figure, the original image (encompassed by the bold lines) has a size of 5×5 pixels, wherein the intensity of each pixel is the number shown in the corresponding location. Note that in this example, the vector calculator 11 adds 0's at the outer periphery, instead of mirror projecting the intensities of the peripheral pixels. Assuming the pixel at the lower-left corner has a coordinate (0,0), the ROI has a size of 3×3 pixels, and Dist=1, thus according to the equations (2-1) to (2-3), the gravity vector Gravity($x_1$,$y_1$) of the pixel at the coordinate (1,1) is $$\text{Gravity\_x}_1 = \frac{(-9 + 19 \times 0 + 24 - 4 + 5 \times 0 + 18 - 10 + 20 \times 0 + 35)}{(9 + 19 + 24 + 4 + 5 + 18 + 10 + 20 + 35)}$$
$$= \frac{54}{144}$$

$$\text{Gravity\_y}_1 = \frac{(9 + 19 + 24 + 4 \times 0 + 5 \times 0 + 18 \times 0 - 10 - 20 - 35)}{(9 + 19 + 24 + 4 + 5 + 18 + 10 + 20 + 35)}$$
$$= \frac{-13}{144}$$

And similarly, the gravity vectors of other pixels in the image can be obtained.

It should be noted that the size of the ROI may be adjusted according to the actual requirement, and the shape of the ROI is not necessarily rectangular; it may be of any symmetrical shape such as a substantial circular shape, a rhombus shape, or the like. The vector calculator 11 should adjust the size of the mirror image according to the size of the ROI, so that the mirror image is sufficiently large for calculation of the gravity vectors of all the pixels.

The vector processor 12 is electrically connected with the vector calculator 11. The vector processor 12 categorizes the pixels of one original image into several groups according to the gravity vectors. A different number is assigned to a different group, as a gravity index. The number is given according to the location of the gravity vector in a two-dimensional space. The gravity indices of the pixels are stored in the buffer register 14.

In one embodiment according to the present invention, the vector processor 12 categorizes the pixels by the product of Gravity_$x_i$×Gravity_$y_i$. A pixel having a value of Gravity_$X_i$×Gravity_$y_i$≧0 is assigned to a first group, and a pixel having a value of Gravity_$x_i$×Gravity_$y_i$≦0 is assigned to a second group, in which each pixel in the first group is assigned a gravity index "0", and each pixel in the second group is assigned a gravity index "1", whereby a gravity indices image, i.e., an image of gravity indices, is generated.

Figures 11, 12:
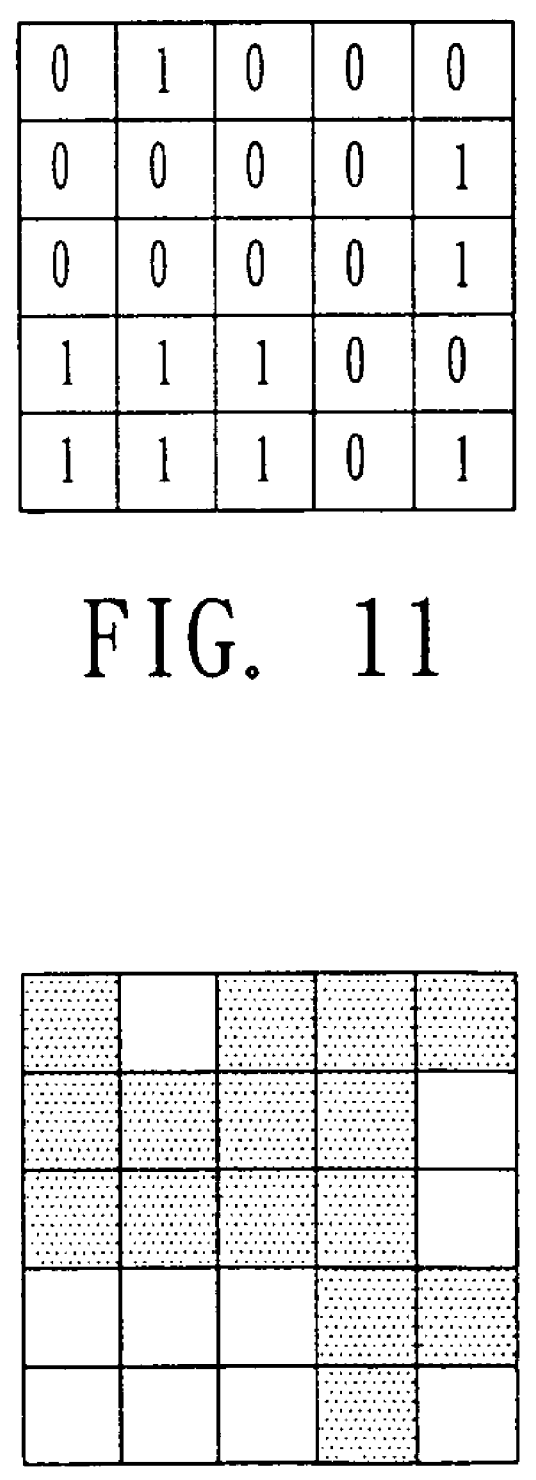

As an illustrative example, if an original image of 5×5 pixels has a gravity vector distribution as shown in FIG. 10, then the grouping method according to the present invention will result in a table as shown in FIG. 11. If each of the pixels having a gravity index "1" is assigned the highest intensity (white, brightest), and each of the pixels having a gravity index "0" is assigned the lowest intensity (black, darkest), then a corresponding gravity indices image may be generated as shown in FIG. 12.

Figure 13:
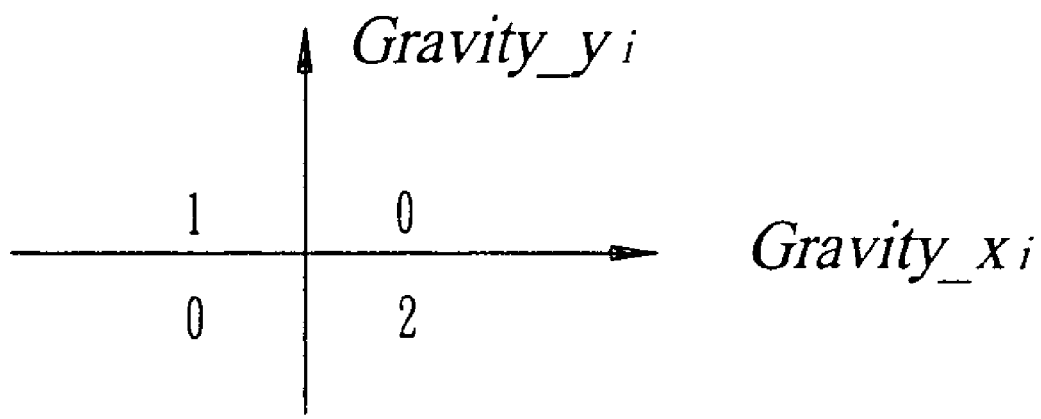
FIG. 13 shows another grouping method to categorize the gravity vectors into three groups.

It is of course possible for the vector processor 12 to categorize the pixels in other manners. For example, in FIG. 13, the gravity vectors are categorized into three groups according to the coordinate (Gravity_$x_i$, Gravity_$y_i$). More specifically, a number "0" is assigned as the intensity of any pixel whose gravity coordinate (Gravity_$x_i$, Gravity_$y_i$) is located in the first or third quadrant; a number "1" is assigned as the intensity of any pixel whose gravity coordinate is located in the second quadrant; and a number "2" is assigned as the intensity of any pixel whose gravity coordinate is located in the fourth quadrant. These numbers correspond to three different intensities such as white, gray, and black, resulting in a three-level gray-scale image of gravity indices.

Figure 14:
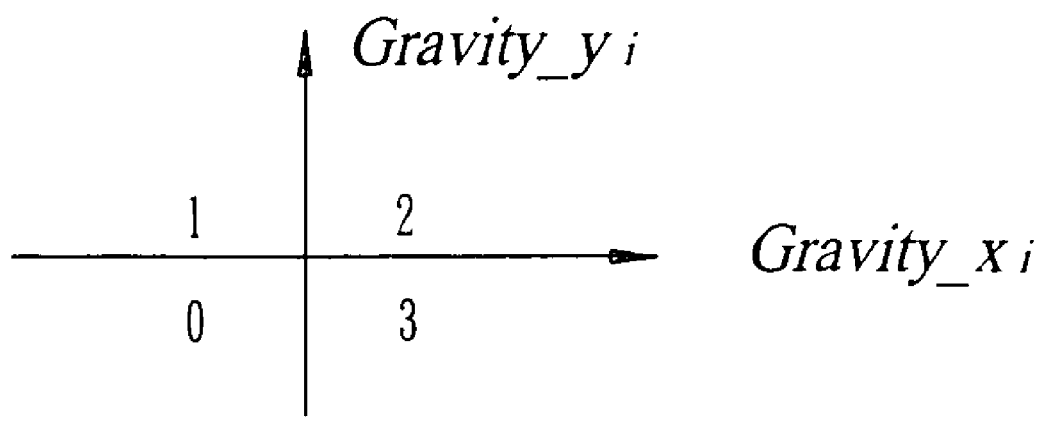
FIG. 14 shows another grouping method to categorize the gravity vectors into four groups.
Figure 15:
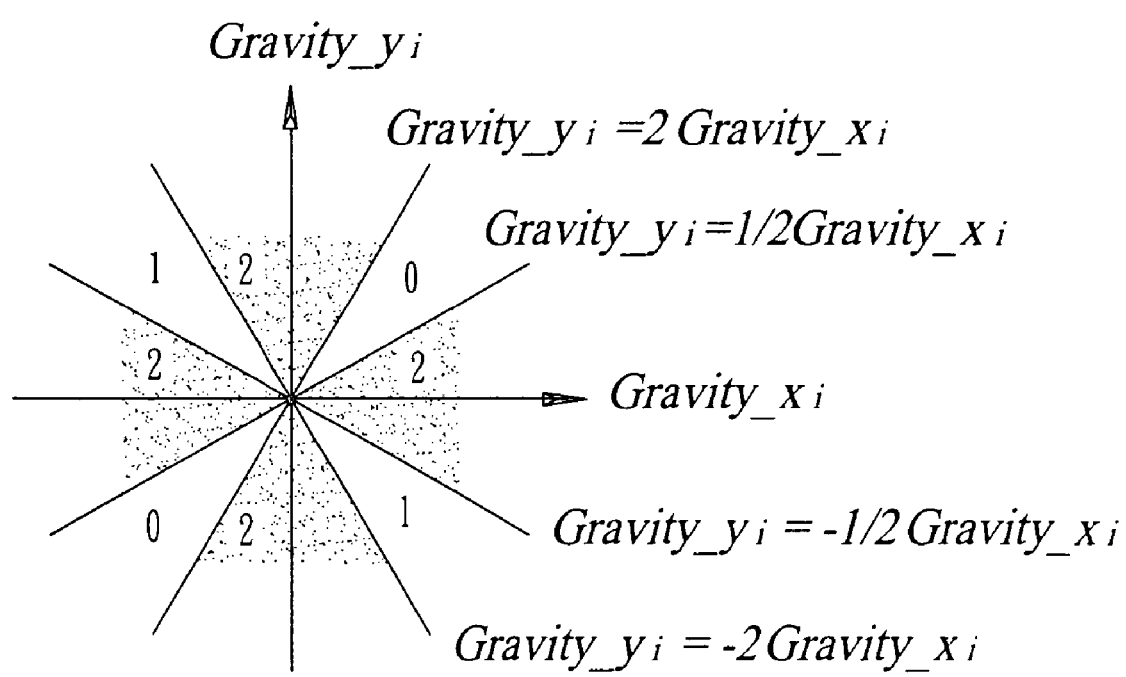
FIG. 15 shows a further other grouping method to categorize the gravity vectors into three groups.

As another example, as shown in FIG. 14, the pixels may be categorized into four groups according to the quadrant in which the gravity coordinate (Gravity_$x_i$, Gravity_$y_i$) is located. As a further example, as shown in FIG. 15, the pixels may be categorized in the following manner:

Group I:
|Gravity_$x_i$|<1/2×|Gravity_$y_i$|  and  |Gravity_$x_i$|>2×|Gravity_$y_i$|

Figure 1:
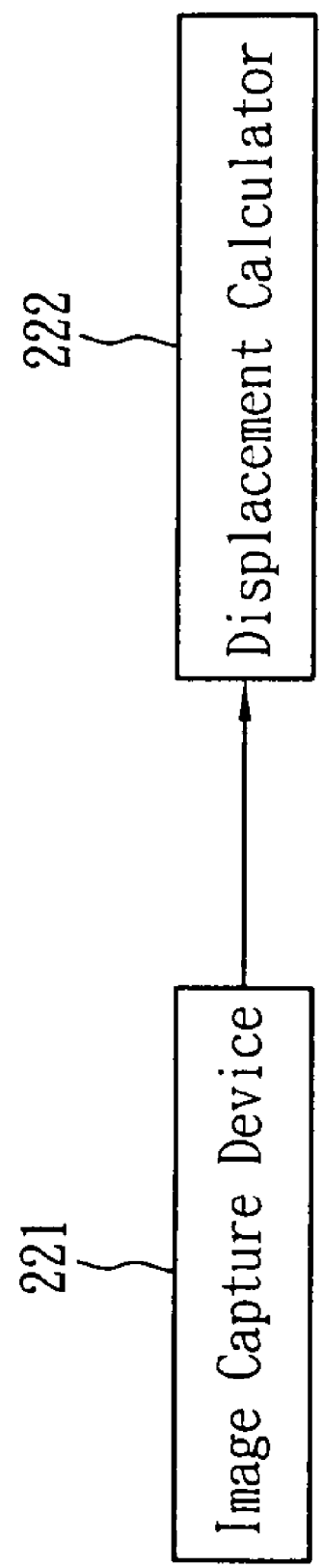
FIG. 1 is a block diagram schematically showing the circuitry of a conventional optical mouse.
Figure 2:
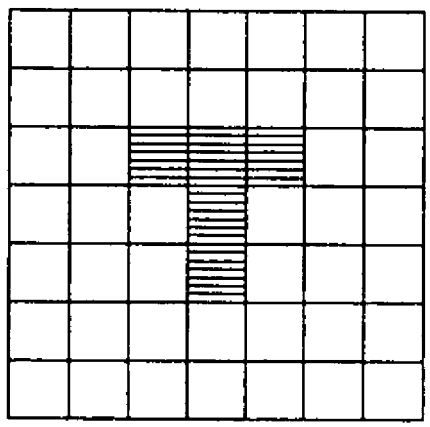
FIG. 2 shows a first image, a second image, and a region of interest (ROI) selected from the first image.
Figure 2:
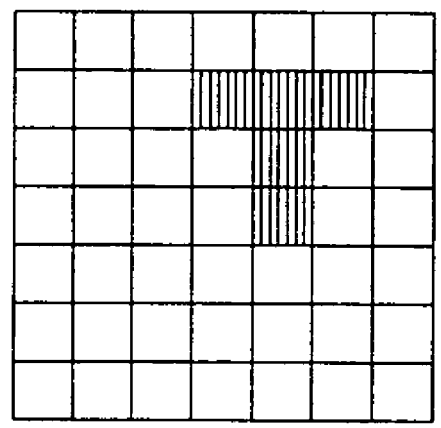
Figure 2:
Figure 2:
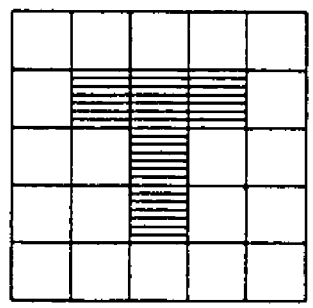
Figure 3:
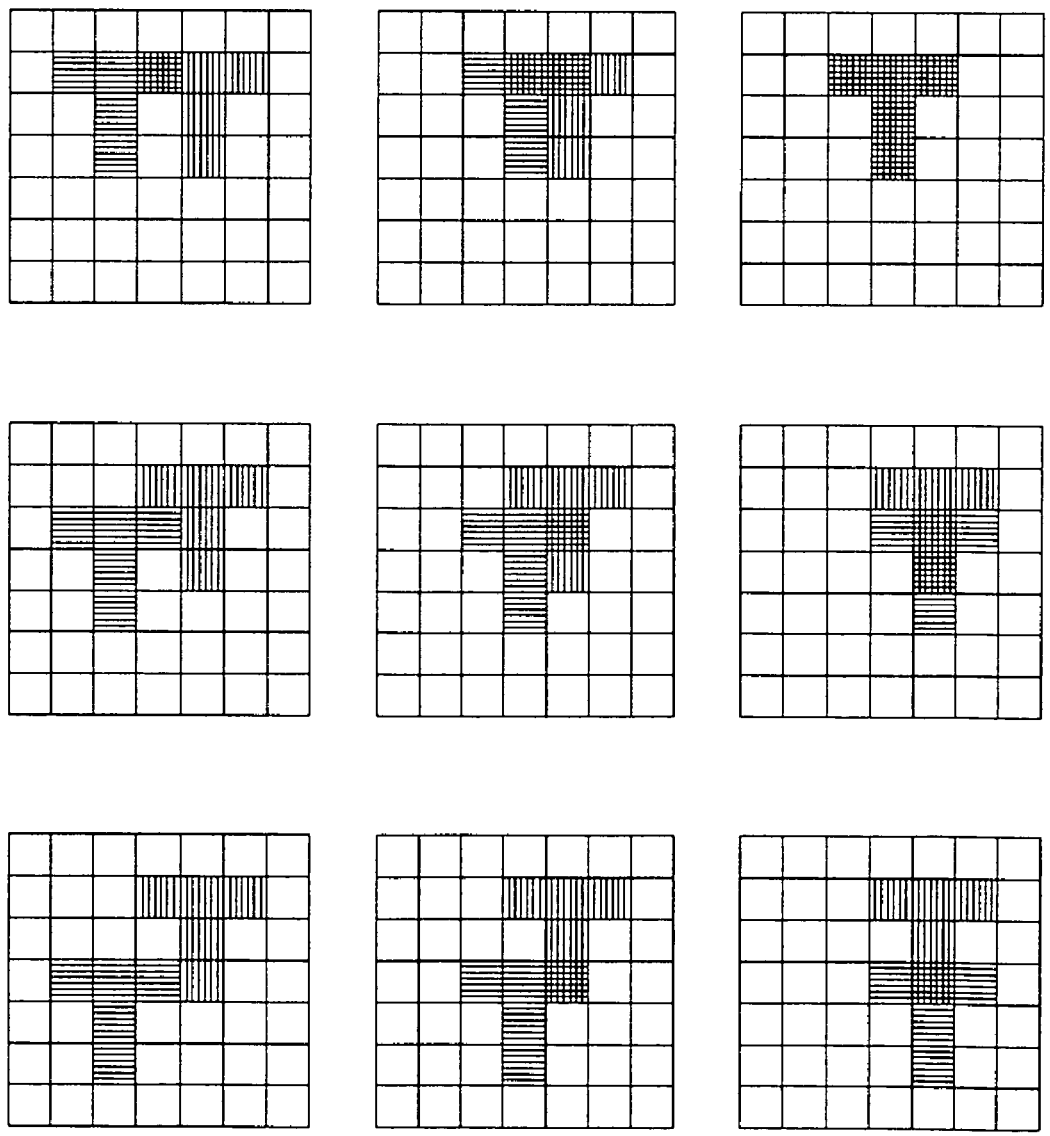
FIG. 3 explains how the ROI is moved around the second image and how the correlation between the ROI and the second image is determined.

Group II:
−2×Gravity_$y_i$≧Gravity_$x_i$≧−1/2×Gravity_$y_i$, and
−2×Gravity_$y_i$≦Gravity_$x_i$≦−1/2×Gravity_$y_i$ Group III:
2×Gravity_$y_i$≧Gravity_$x_i$≧1/2×Gravity_$y_i$, and
2×Gravity_$y_i$≦Gravity_$x_i$≦1/2×Gravity_$y_i$ The displacement calculator 13 is electrically connected with the buffer register 14. It retrieves the gravity indices from the buffer register 14, and calculates the displacement vector from a pattern in a first gravity indices image to a pattern in a second gravity indices image; the calculated displacement vector is determined as the displacement vector between the patterns in the first original image and the second original image. The methods used by the displacement calculator 13 for calculation include, but are not limited to, comparing the gravities of the gravity indices images, or the conventional correlation method as described with reference to FIGS. 2 and 3.

The gravity of a gravity indices image may be obtained from the following equation (2-4):

$$\text{Index\_Gravity}(x_i, y_i)^n = \left[ \sum_{j=1}^{P} f(x_j)\delta(\text{index}_j^n - i), \sum_{j=1}^{P} f(y_j)\delta(\text{index}_j^n - i) \right] \quad \text{Eq. (2-4)}$$

and the gravity displacement vector S, to be obtained from the gravities of two successive gravity indices images, may be calculated by the following equations (2-5) and (2-6):

$$S = [\text{Index\_Gravity}(x_i, y_i)^n - \text{Index\_Gravity}(x_i, y_i)^{n-1}]/NF_i \quad \text{Eq. (2-5)}$$

$$NF_i = \sum_{j=1}^{P} [\delta(\text{index}_j^n - i) - \delta(\text{index}_j^n - i)\delta(\text{index}_j^{n-1} - i)] \quad \text{Eq. (2-6)}$$

wherein Index_Gravity($x_i$,$y_i$)$^{n-1}$ and Index_Gravity($x_i$,$y_i$)$^n$ are, respectively, the gravities of the (n−1)th gravity indices image and the nth gravity indices image; i is the gravity index; index$_j^n$ is the gravity index of the jth pixel, and the value of the function δ(index$_j^n$−i) is 1 if index$_j^n$−i=0, otherwise 0; P is the number of pixels included in the nth image; the functions f(x) and f(y) may be, for example, f(x)=x and f(y)=y, but may be other functions; $NF_i$ is a normalization factor.

It should be noted that the pixels in an image may be categorized in a plurality of manners according to the gravity vectors, and therefore an image may generate multiple gravity indices images. However, anyone of the multiple gravity indices images may be used to obtain the displacement vector S.

Figure 16:
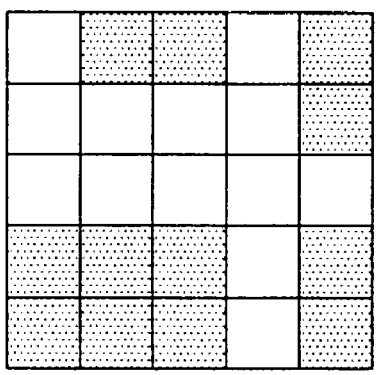
FIG. 16 shows that a gravity is obtained for each gravity indices image, and how the displacement vector is obtained from the gravities of two successive gravity indices images.
Figure 16:
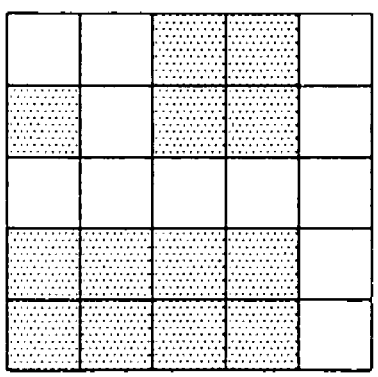

FIG. 16 shows an example as to how the displacement vector is obtained from the gravities of the first and second gravity indices images. The gravity indices images are each of a size of 5×5 pixels, and the gravity index of a white pixel is "1", whereas the gravity index of a black pixel is "0". The center pixel is assigned a coordinate (0,0), and k(x)=x; k(y) =y. The gravity of a pattern constituted by the pixels having an index of "1" in the first gravity indices image, Index_Gravity $(x_1,y_1)^1$, and the gravity of a pattern constituted by the pixels having an index of "1" in the second gravity indices image, Index_Gravity$(x2,y_1)^2$, may be obtained from the equation (2-4):

Index_Gravity$(x_1, y_1)^1$=[−2×3−1×2+1×5+2×1, 2×2+ 1×4−1×1−2×1]=[−1, 5]

Index_Gravity$(x_1, y_1)^2$=[−2×2−1×3+1×1+2×5, 2×3+ 1×2−1×1−2×1]=[4, 5]

and the normalization factor $NF_i$ may be obtained from the equation (2-6) as follows:

$NF_i$=12−7=5 and therefore, the displacement vector between the patterns is:

S=[(4, 5)−(−1, 5)]/5=(1, 0)

Figure 17:
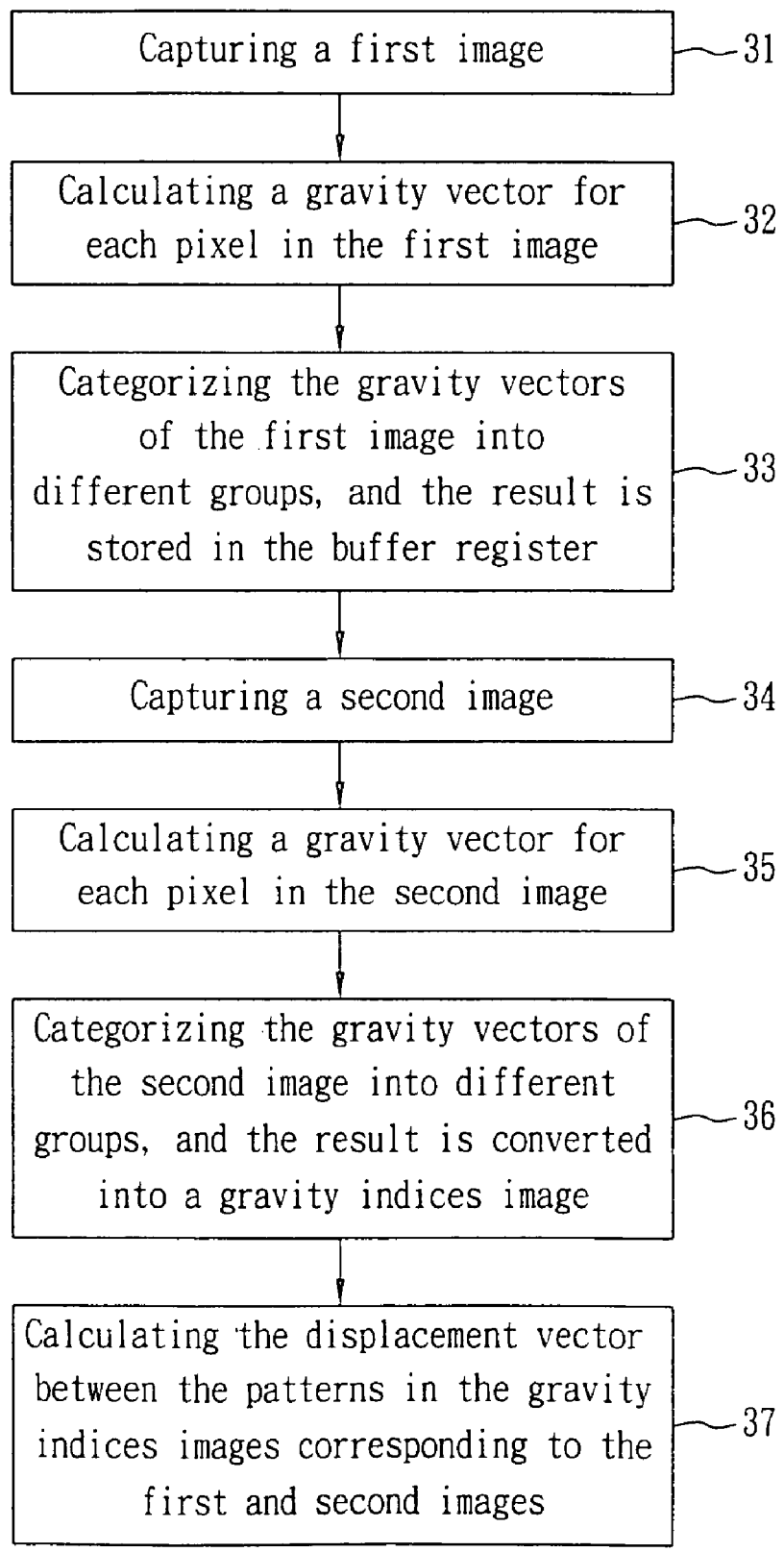
FIG. 17 shows a flow chart of the displacement estimation method according to a preferred embodiment of the present invention.

Referring to FIG. 17, according to another preferred embodiment of the present invention, a method for estimating pattern displacement by an optical mouse includes the steps of:

Step 31: the image capture device 2 captures a first image.
Step 32: the vector calculator 11 calculates a gravity vector for each pixel in the first image according to the equation (2-1), and sends it to the vector processor 12.
Step 33: the vector processor 12 categorizes the gravity vectors of the first image into different groups, and assigns a different number to each group as the gravity index of every pixel in that group; the gravity index is sent to the buffer register 14.
Step 34: the image capture device 2 captures a second image.
Step 35: the vector calculator 11 calculates a gravity vector for each pixel in the second image, and sends it to the vector processor 12.
Step 36: the vector processor 12 categorizes the gravity vectors of the second image into different groups, and assigns a different number to each group as the gravity index of every pixel in that group; the gravity index is sent to the buffer register 14.
Step 37: the displacement calculator 13 retrieves the gravity indices in the buffer register 14, and calculates the displacement vector between the patterns in two successive gravity indices images.

It should be noted that the displacement calculator 13 may calculate the displacement vector based on the correlation between the gravity vectors of the first and second images, or based on the correlation between the two gravity indices images, or based on the displacement between the gravities of the two gravity indices images.

The displacement estimation device 1 according to the present invention may be electrically connected with an image capture device 221 of an optical mouse, to calculate the displacement vector between patterns in two images, and outputs the displacement vector to a computer for controlling the movement of a cursor on the screen of the computer.

In addition to the above, the displacement estimation device 1 according to the present invention may be applied to other optical pointing devices for controlling the movement of a cursor on the screen, or even applied to any apparatuses that requires tracing the positional changes of images. For example, the displacement estimation device 1 according to the present invention may be installed in an automobile having the capability of capturing images, for determining whether the automobile deflects from a driving lane. Or, the displacement estimation device 1 according to the present invention may be applied to a navigation system, or to a speeding detector, wherein the displacement of an automobile calculated by the displacement estimation device 1 is divided by the time difference between two images to obtain the speed of the automobile.

In summary, according to the present invention, the gravity vector of a pixel incorporates the information of all pixels surrounding that pixel, and in contrast to the intensity information of a pixel in the original image, which includes only one element (i.e., the intensity information is a one-dimensional vector), the gravity vector according to the present invention includes two elements (a two-dimensional vector), which is capable of expressing the relationship between a pixel and its surrounding pixels, and the intensities thereof. Furthermore, the vector processor 12 categorizes the gravity vectors into groups to reduce the data amount of a gravity indices image; the number of the gray scale levels of the gravity indices image is much less than that of the original image, so the calculation in the displacement calculator 13 is much faster.

The features, characteristics and effects of the present invention have been described with reference to its preferred embodiments, which are illustrative of the invention rather than limiting of the invention. Various other substitutions and modifications will occur to those skilled in the art, without departing from the spirit of the present invention. Therefore, all such substitutions and modifications are intended to be embraced within the scope of the invention as defined in the appended claims.

What is claimed is:

1. A displacement estimation device, for use in estimating a displacement vector from a first pattern in a first original image to a second pattern in a second original image, wherein each original image includes a plurality of pixels, said device comprising:

a vector calculator calculating at least a first parameter for a first pixel in said first original image and at least a second parameter for a second pixel in said second original image, said first and second parameters integrating, respectively, the information of: (a) the intensities of pixels in a region of interest surrounding said first and second pixels, and (b) the relative distances from said surrounding pixels to said first and second pixels;

a displacement calculator electrically connected with said vector calculator, and calculating said displacement vector based on said parameters calculated by said vector calculator for said first original image and said second original image; and a vector processor electrically connecting with said vector calculator and said displacement calculator, wherein said vector processor categorizes said plurality of pixels of each said original image into two or more groups according to the parameter of each of said plurality of pixels, and assigns a different number to each group as a gravity index; and wherein said displacement calculator calculates said displacement vector based on a gravity displacement (S) which is a normalized displacement between gravities of said gravity indices of said first and second original images, wherein said gravity displacement (S) is calculated by:

$$S = [\text{Index\_Gravity}(x_i, y_i)^n - \text{Index\_Gravity}(x_i, y_i)^{n-1}] / NF_i$$

wherein Index Gravity $(x_i, y_i)^{n-1}$ and Index Gravity $(x_i, y_i)^n$ are, respectively, the gravities of the gravity indices of the (n−1)th original image and the nth original image, and $NF_i$ is a normalization factor, which are obtained from the following equations:

$$\text{Index\_Gravity}(x_i, y_i)^n = \begin{bmatrix} \sum_{j=1}^{P} f(x_j) \delta(\text{index}_j^n - i), \\ \sum_{j=1}^{P} f(y_j) \delta(\text{index}_j^n - i) \end{bmatrix}$$

$$NF_i = \sum_{j=1}^{P} [\delta(\text{index}_j^n - i) - \delta(\text{index}_j^n - i) \delta(\text{index}_j^{n-1} - i)]$$

wherein $f(x) = x$; $f(y) = y$; $i$ is the gravity index; $\text{index}_j^n$ is the gravity index of the jth pixel, and the value of the function $\delta(\text{index}_j^n - i)$ is 1 if $\text{index}_j^n - i = 0$, otherwise 0; and P is the number of pixels included in the nth original image.

2. The displacement estimation device according to claim 1, wherein said displacement calculator calculates said displacement vector based on the correlation between the parameters of said first and second original images.

3. The displacement estimation device according to claim 1, further comprising a buffer register electrically connecting with said vector processor and said displacement calculator, for storing said gravity indices.

4. The displacement estimation device according to claim 1, which is installed in an optical pointing device.

5. The displacement estimation device according to claim 4, wherein said optical pointing device is an optical mouse.

6. A displacement estimation method, for use in estimating a displacement vector from a first pattern in a first original image to a second pattern in a second original image, wherein each original image includes a plurality of pixels, said method comprising:

(Step A) calculating at least a first parameter for a first pixel in said first original image and at least a second parameter for a second pixel in said second original image, said first and second parameters integrating, respectively, the information of: (a) the intensities of pixels in a region of interest surrounding said first and second pixels, and (b) the relative distances from said surrounding pixels to said first and second pixels; and (Step B) calculating said displacement vector based on said parameters calculated by said vector calculator for said first original image and said second original image, wherein said Step B includes:

(Step B1) categorizing said plurality of pixels of each said original image into two or more groups according to the parameter of each of said plurality of pixels, and assigning different number to each group as a gravity index; and (Step B2) calculating said displacement vector based on a gravity displacement which is a normalized displacement (S) between gravities of said gravity indices of said first and second original images, wherein said gravity displacement (S) is calculated by:

$$S = [\text{Index\_Gravity}(x_i, y_i)^n - \text{Index\_Gravity}(x_i, y_i)^{n-1}] / NF_i$$

wherein Index Gravity $(x_i, y_i)^{n-1}$ and Index Gravity $(x_i, y_i)^n$ are, respectively, the gravities of the gravity indices of the (n−1)th original image and the nth original image, and $NF_i$ is a normalization factor, which are obtained from the following equations:

$$\text{Index\_Gravity}(x_i, y_i)^n = \begin{bmatrix} \sum_{j=1}^{P} f(x_j) \delta(\text{index}_j^n - i), \\ \sum_{j=1}^{P} f(y_j) \delta(\text{index}_j^n - i) \end{bmatrix}$$

$$NF_i = \sum_{j=1}^{P} [\delta(\text{index}_j^n - i) - \delta(\text{index}_j^n - i) \delta(\text{index}_j^{n-1} - i)]$$

wherein $f(x) = x$; $f(y) = y$; $i$ is the gravity index; $\text{index}_j^n$ is the gravity index of the jth pixel, and the value of the function $\delta(\text{index}_j^n - i)$ is 1 if $\text{index}_j^n - i = 0$, otherwise 0; and P is the number of pixels included in the nth original image.

7. The displacement estimation method according to claim 6, wherein said Step B is based on the correlation between the parameters of said first and second original images.

* * * * *